United States Patent
Nikam et al.

(10) Patent No.: US 9,247,179 B2
(45) Date of Patent: Jan. 26, 2016

(54) REVERSE VIDEO PLAYBACK IN A DATA PROCESSING DEVICE

(71) Applicant: NVIDIA Corporation, Santa Clara, CA (US)

(72) Inventors: Sachin Krishna Nikam, Maharashtra (IN); Vinayak Jayaram Pore, Maharashtra (IN); Mohan Tulshiram Nimaje, Maharashtra (IN)

(73) Assignee: NVIDIA Corporation, Santa Clara, CA (US)

( * ) Notice: Subject to any disclaimer, the term of this patent is extended or adjusted under 35 U.S.C. 154(b) by 497 days.

(21) Appl. No.: 13/680,125

(22) Filed: Nov. 19, 2012

(65) Prior Publication Data
US 2014/0140676 A1    May 22, 2014

(51) Int. Cl.
| | |
|---|---|
| H04N 5/783 | (2006.01) |
| H04N 5/445 | (2011.01) |
| H04N 5/76 | (2006.01) |
| H04N 21/43 | (2011.01) |
| H04N 21/472 | (2011.01) |
| H04N 21/854 | (2011.01) |

(52) U.S. Cl.
CPC .......... *H04N 5/445* (2013.01); *H04N 5/76* (2013.01); *H04N 5/783* (2013.01); *H04N 21/4307* (2013.01); *H04N 21/47217* (2013.01); *H04N 21/85406* (2013.01)

(58) Field of Classification Search
CPC ......... H04N 5/445; H04N 5/76; H04N 5/783; H04N 21/4307; H04N 21/47217; H04N 21/85406
See application file for complete search history.

(56) References Cited

U.S. PATENT DOCUMENTS

| | | | |
|---|---|---|---|
| 5,802,242 A | 9/1998 | Kawamura et al. | |
| 6,970,640 B2 | 11/2005 | Green et al. | |
| 7,024,098 B2 | 4/2006 | Lin et al. | |
| 7,035,333 B2 | 4/2006 | Stenzel | |
| 7,231,138 B1 * | 6/2007 | van Welzen et al. | 386/232 |
| 7,555,042 B2 | 6/2009 | Kim et al. | |
| 8,184,960 B2 | 5/2012 | Hu | |
| 2008/0273858 A1 * | 11/2008 | Wald et al. | 386/68 |
| 2012/0017150 A1 * | 1/2012 | Pollack | 715/716 |
| 2012/0105722 A1 * | 5/2012 | Kang et al. | 348/563 |
| 2012/0308204 A1 * | 12/2012 | Hwang | 386/241 |
| 2013/0251333 A1 * | 9/2013 | Berbecel et al. | 386/230 |

OTHER PUBLICATIONS http://www.jakeludington.com/dv_hacks/20070306_reverse_a_video_clip_and_play_it_backwards.html.

* cited by examiner

*Primary Examiner* — Tat Chio
(74) *Attorney, Agent, or Firm* — Zilka-Kotab, PC

(57) ABSTRACT

A method includes initiating, through an interface of a data processing device, reverse playback of a video file stored in a memory of the data processing device. The method also includes causing, through a set of instructions associated with a processor of the data processing device communicatively coupled to the memory and/or an operating system executing on the data processing device, the processor to read frames corresponding to the video file in a reverse chronological order within a desired timeframe following the initiation of the reverse playback. Further, the method includes decoding, through the processor, each frame corresponding to the reverse chronological order for rendering thereof on the data processing device.

20 Claims, 6 Drawing Sheets

REVERSE VIDEO PLAYBACK IN A DATA PROCESSING DEVICE

FIELD OF TECHNOLOGY

This disclosure relates generally to data processing devices and, more particularly, to reverse video playback in a data processing device.

BACKGROUND

A data processing device (e.g., a personal computer, a laptop computer, a notebook computer, a mobile device such as a mobile phone) may have video files stored therein. The video files may be rendered on a user interface of a multimedia application (e.g., Windows Media Player®) on the data processing device. A user (e.g., a referee in a sports match, television broadcaster personnel) of the data processing device may want to play a video file in reverse on the data processing device in order to determine a course of action based on examining time-specific events displayed through the video file. The user may have to manually move a slider on the data processing device to go to a particular point in time of the video associated with the video file. The aforementioned process may not be smooth and may require unnecessary human finesse, leading to frustration on part of the user.

SUMMARY

Disclosed are a method, a device and/or a system of reverse video playback in a data processing device.

In one aspect, a method includes initiating, through an interface of a data processing device, reverse playback of a video file stored in a memory of the data processing device. The method also includes causing, through a set of instructions associated with a processor of the data processing device communicatively coupled to the memory and/or an operating system executing on the data processing device, the processor to read frames corresponding to the video file in a reverse chronological order within a desired timeframe following the initiation of the reverse playback. Further, the method includes decoding, through the processor, each frame corresponding to the reverse chronological order for rendering thereof on the data processing device.

In another aspect, a non-transitory medium, readable through a data processing device and comprising instructions embodied therein that are executable through the data processing device, is disclosed. The non-transitory medium includes instructions to initiate, through an interface of the data processing device, reverse playback of a video file stored in a memory of the data processing device. The non-transitory medium also includes instructions to cause, through a set of instructions associated with a processor of the data processing device communicatively coupled to the memory and/or an operating system executing on the data processing device, the processor to read frames corresponding to the video file in a reverse chronological order within a desired timeframe following the initiation of the reverse playback.

Further, the non-transitory medium includes instructions to decode, through the processor, each frame corresponding to the reverse chronological order for rendering thereof on the data processing device.

In yet another aspect, a data processing device includes a memory having a video file stored therein, a processor communicatively coupled to the memory, an interface to initiate reverse playback of the video file stored in the memory, and a driver component associated with the processor. The driver component and/or an operating system executing on the data processing device is configured to cause the processor to read frames corresponding to the video file in a reverse chronological order within a desired timeframe following the initiation of the reverse playback. The processor is further configured to execute instructions to decode each frame corresponding to the reverse chronological order for rendering thereof on the data processing device.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Example embodiments, as described below, may be used to provide a method, a device and/or a system of reverse video playback in a data processing device. Although the present embodiments have been described with reference to specific example embodiments, it will be evident that various modifications and changes may be made to these embodiments without departing from the broader spirit and scope of the various embodiments.

Figure 1:
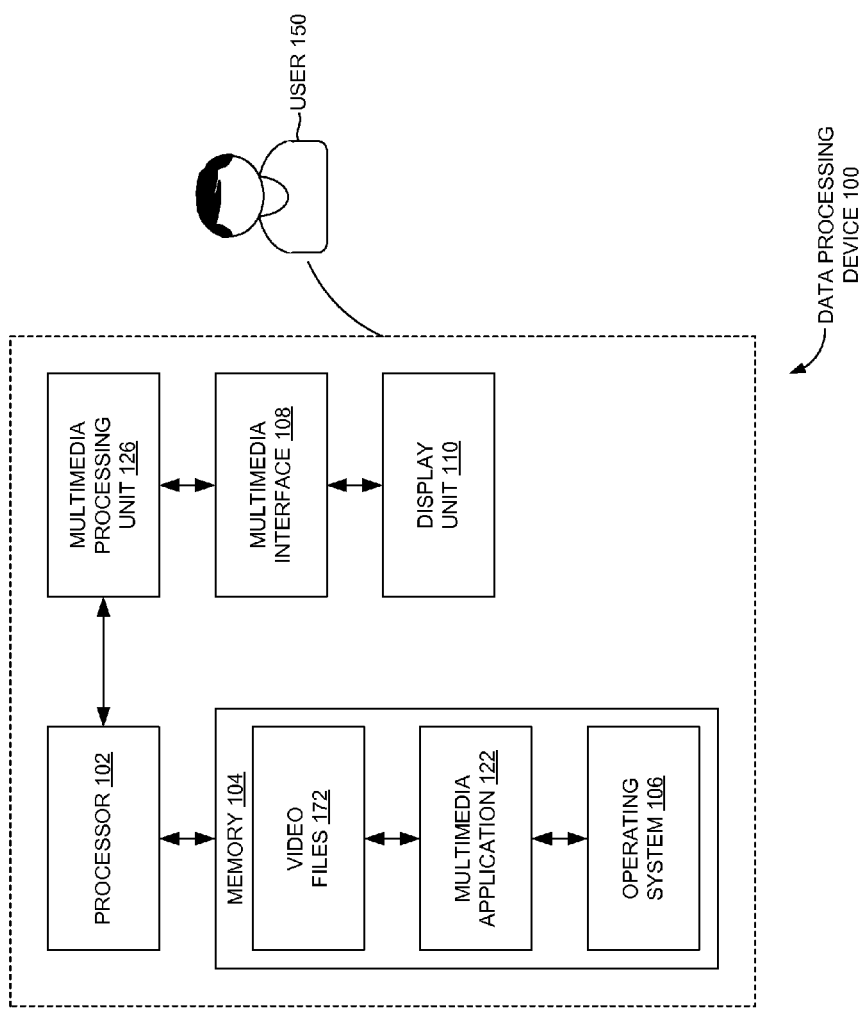
FIG. 1 is a schematic view of a data processing device, according to one or more embodiments.

FIG. 1 shows a data processing device 100, according to one or more embodiments. An example data processing device 100 may include but is not limited to a desktop computer, a laptop computer, a notebook computer, a tablet and a mobile device such as a mobile phone. In one or more embodiments, data processing device 100 may include a processor 102 (e.g., Central Processing Unit (CPU), Graphics Processing Unit (GPU)) communicatively coupled to a memory 104, processor 102 being configured to address storage locations in memory 104. In one or more embodiments, memory 104 may include a volatile memory (e.g., Random Access Memory (RAM)) and/or a non-volatile memory (e.g., Read-Only Memory (ROM), hard disk).

In one or more embodiments, output data associated with processing through processor 102 may be input to a multimedia processing through processor 126 configured to perform encoding/decoding associated with the data. In one or more embodiments, the output of multimedia processing unit 126 may be rendered on a display unit 110 (e.g., Liquid Crystal Display (LCD) display, Cathode Ray Tube (CRT) monitor) through a multimedia interface 108 configured to convert data to an appropriate format required by display unit 110.

It is obvious that an operating system 106 may execute on data processing device 100. FIG. 1 shows operating system 106 as being stored in memory 104 (e.g., non-volatile memory). In one or more embodiments, data processing device 100 may execute a multimedia application 122 (e.g., Windows Media Player®) on processor 102; FIG. 1 shows multimedia application 122 as being stored in memory 104 to be executed on processor 102. In one or more embodiments, multimedia application 122 may utilize an Application Programming Interface (API) of a multimedia framework (to be discussed with regard to FIG. 2) in order to execute processing associated therewith.

Figure 2:
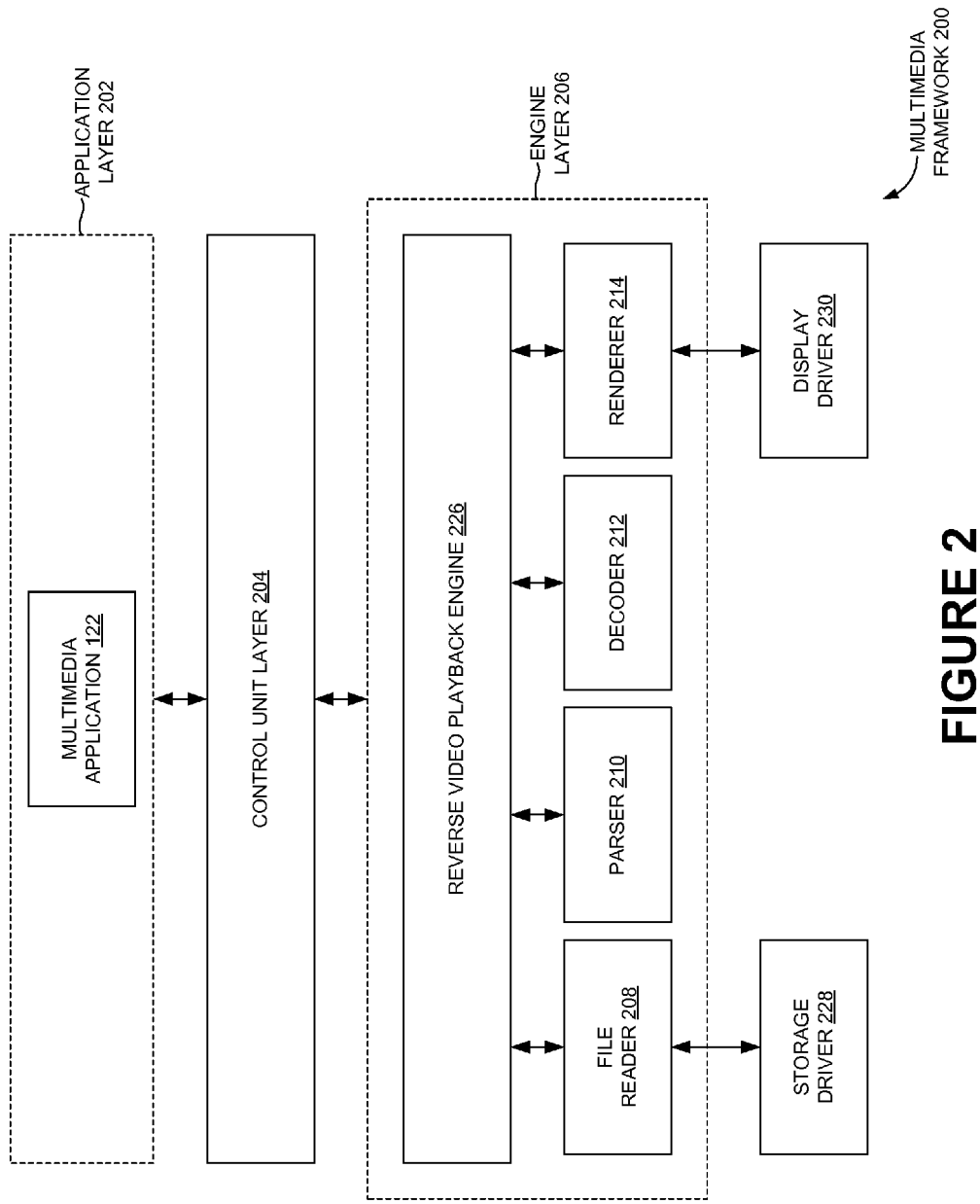
FIG. 2 is a schematic view of a multimedia framework implemented in the data processing device of FIG. 1, according to one or more embodiments.

FIG. 2 shows a multimedia framework 200 implemented in data processing device 100, according to one or more embodiments. In one or more embodiments, multimedia framework 200 may provide multimedia capture, processing and/or playback facilities utilizing local or remote sources. In one or more embodiments, multimedia framework 200 may be above a foundation layer that facilities access of hardware such as a soundcard. In one or more embodiments, multimedia framework 200 may include an application layer 202 configured to communicate with a control unit layer 204 to enable performing a task required by multimedia application 122. Thus, multimedia application 122 may be at a level of application layer 202. In one or more embodiments, control unit layer 204 may control dataflow through engines (or, modules; shown as part of engine layer 206) of multimedia framework 200 such as file reader 208, parser 210, decoder 212 and renderer 214.

File reader 208 may be configured to enable reading of data (e.g., video file, multimedia file) from a source. Parser 210 (e.g., Moving Picture Experts Group (MPEG) parser, Audio-Video Interleave (AVI) parser) may parse a stream of the data into constituent parts thereof. Decoder 212 may decode a compressed or an encoded version of the data and renderer 214 may transmit the decoded data to a destination (e.g., a rendering device). The rendering process may also include processes such as displaying multimedia on display unit 110, playing an audio file on a soundcard, writing the data to a file etc. It is obvious that the aforementioned engines (or, modules) are merely shown for illustrative purposes and that variations therein are within the scope of the exemplary embodiments.

FIG. 2 also shows storage driver 228 (e.g., a set of instructions) and display driver 230 (e.g., a set of instructions) being associated (by way of being communicatively coupled) with file reader 208 and renderer 214 respectively. Further, FIG. 2 shows a reverse video playback engine 226 (e.g., a software engine) to enable software and/or hardware support to play video files (e.g., video files 172 shown stored in memory 104 of data processing device 100) in reverse. In one or more embodiments, multimedia application 122 may provide an interface for a user 150 of data processing device 100 to enable application of desired settings on a video file to be rendered therethrough and/or perform desired tasks during the rendering such as rewinding, fast-forwarding, playing and stopping. In one or more embodiments, the aforementioned interface may also offer user 150 the option of playing the video file in reverse, as will be shown in FIG. 3.

Figure 3:
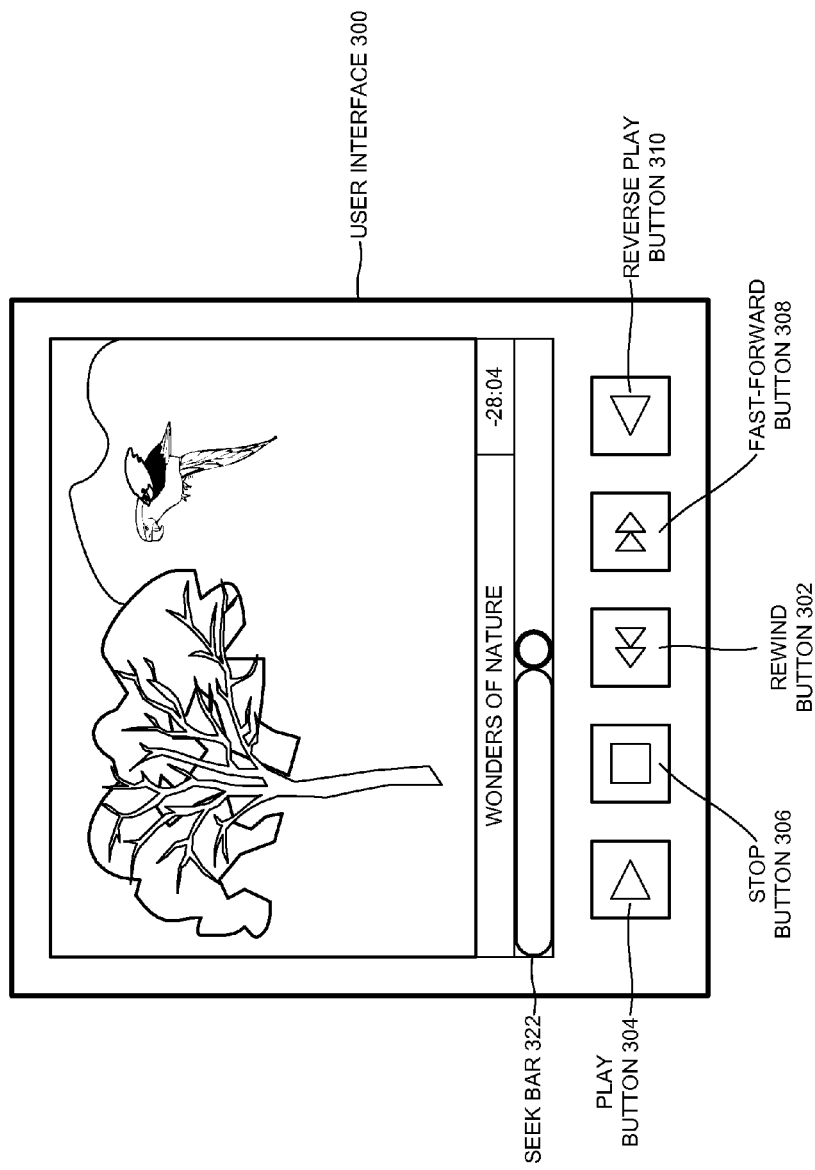
FIG. 3 is a schematic view of a user interface of a multimedia application executing on the data processing device of FIG. 1, according to one or more embodiments.

FIG. 3 shows a user interface 300 of multimedia application 122, according to one or more embodiments. In one or more embodiments, user interface 300 may include a rewind button 302, a play button 304, a stop button 306, a fast-forward button 308 and a reverse play button 310. The aforementioned buttons are self-explanatory; initiation of playing a video file in the reverse order through reverse play button 310 may require a driver component (e.g., driver of processor 102, driver packaged with operating system 106, driver packaged with multimedia application 122 and/or associated software) therefor. In one or more embodiments, multimedia application 122 may transmit events related to the action performed by user 150 on user interface 300 to multimedia framework 200. Now, if user 150 clicks an active reverse play button 310 on multimedia application 122 after loading a video file on user interface 300, while viewing a video file on user interface 300 and the like, an event associated therewith may be transmitted to multimedia frame work 200. Here, in one or more embodiments, reverse video playback engine 226 may detect video format of the video file and determine support for reverse playback therefor.

In an example embodiment, if reverse video playback engine 226 detects that the video format is Motion Joint Photographic Experts Group (MJPEG) based, processor 102 may start reading frames of the video file from a current position of a seek bar 322 (e.g., a draggable thumb) of user interface 300 to a start of the video file in reverse order. Decoder 212 may then decode each frame read to render on-screen (e.g., within user interface 300) on display unit 110. In the case of MJPEG videos, no inter-frame dependency exists; information is not shared between neighboring frames. Therefore, an individual read frame may be decoded through a JPEG decoder (example decoder 212) and rendered.

Figure 4:
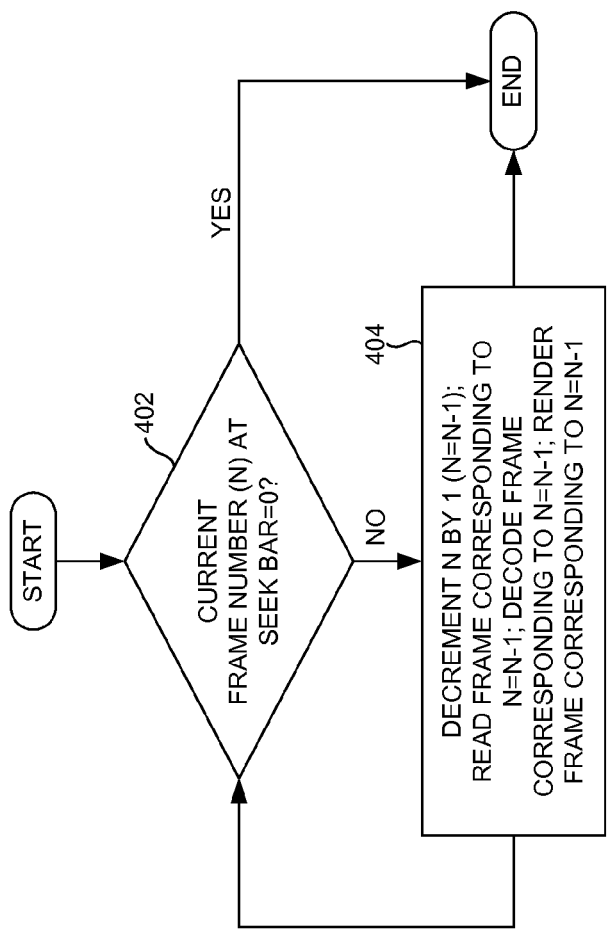
FIG. 4 is a flowchart detailing the operations on frames of a video file during reverse video playback thereof on the data processing device of FIG. 1, according to one or more embodiments.

In one or more embodiments, audio may not be decoded during the reverse playback as audio does not carry meaningful information within the context of the reverse playback. In one or more embodiments, multimedia application 122 may be implemented such that time is decremented within user interface 300 and reverse movement of seek bar 322 is in synchronization with the reverse video playback. FIG. 4 shows a flowchart detailing the operations involved in the reverse video playback discussed above, according to one or more embodiments. In one or more embodiments, operation 402 may involve checking, through processor 102, as to whether the current frame number (N) at seek bar 322 is 0. If yes, the reverse video playback process is ended. If no, operation 404 may involve decrementing the frame number (N) by 1 (or, N=N−1), reading the frame corresponding to a frame number N=N−1, decoding the frame corresponding to the frame number N=N−1 through decoder 212 and rendering frame corresponding to the frame number N=N−1 through renderer 214 on-screen (e.g., within user interface 300).

The above process may be repeated for all remaining frames. In one or more embodiments, it may be required to maintain the frame rate (or, frames per second) during the process. For the aforementioned purpose, each video frame may have timestamp information thereof associated therewith, which can be utilized to determine the frame rate for rendering the video frames. In the forward video playback process, the timestamps may be incremented in an order of 0 (timestamp of the first frame rendered), Int, 2×Int, 3×Int, ... TS(n−1), TS(n) ... End−Int, End, where Int is the time-interval between the timestamps, TS(n−1) is the timestamp of (n−1)th frame, TS(n) is the timestamp of the nth frame and End is the timestamp of the last frame to be rendered.

In the reverse video playback process, the timestamps may be decremented in the order of End, End−Int . . . TS(n), TS(n−1), . . . , 3×Int, 2×Int, Int, 0. Thus, in order to render the decoded frame at the correct timestamp, the example relation TS(n)=TS(n−1)−[TS(n)−TS(n−1)] may be utilized.

It is obvious that seek bar 322 position may not be the only way to trigger reverse video playback. For example, the driver component discussed above may enable automatic reverse video playback following completion of play of a video file. Other possible variations are within the scope of the exemplary embodiments. Further, user 150 may be provided the option (e.g., through user interface 300) to save the video file in the reverse format thereof into memory 104.

It is obvious that the engines of multimedia framework 200 may be executed through processor 102. The driver component or equivalent software thereof discussed above may be stored in memory 104 to be installed on data processing device 100 after a download through the Internet. Alternately, an external memory may be utilized therefor. Also, instructions associated with the driver component may be embodied on a non-transitory medium readable through data processing device 100 such as a Compact Disc (CD), a Digital Video Disc (DVD), a Blu-ray™ disc, a floppy disk, or a diskette etc. The aforementioned instructions may be executable through data processing device 100.

The set of instructions associated with the driver component or equivalent software thereof is not limited to specific embodiments discussed above, and may, for example, be implemented in operating system 106, an application program (e.g., multimedia application 122), a foreground or a background process, a network stack or any combination thereof. Also, it is obvious that the reverse playback process may be initiated through a physical button on data processing device 100, a touchscreen option on data processing device 100, a menu option on-screen on data processing device 100 etc. Further, user 150 may be provided an option to enable/disable reverse video playback in data processing device 100. Other variations are within the scope of the exemplary embodiments discussed herein.

Figure 5:
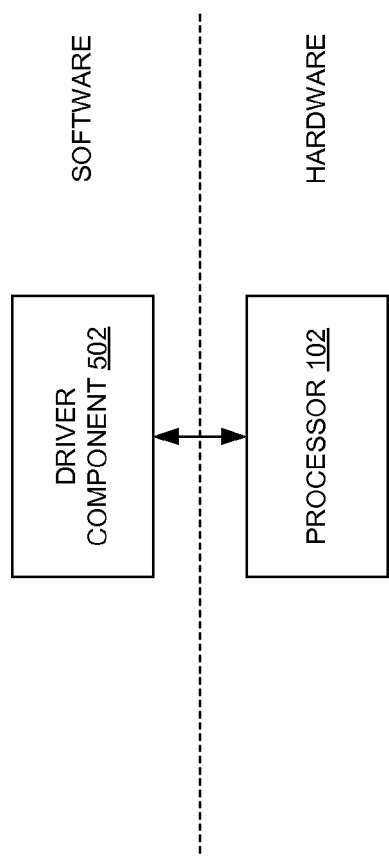
FIG. 5 is a schematic view of interaction between a driver component and a processor of the data processing device of FIG. 1, according to one or more embodiments.

FIG. 5 shows interaction between a driver component 502 and processor 102 (e.g., GPU) during reverse video playback, according to one or more embodiments. In one or more embodiments, when user 150 clicks reverse play button 310 (or, any equivalent action that initiates the reverse video playback, depending on the implementation and the options), driver component 502 may enable processor 102 execute reverse video playback engine 226 and associated engines thereof to play the requisite video file in reverse.

Figure 6:
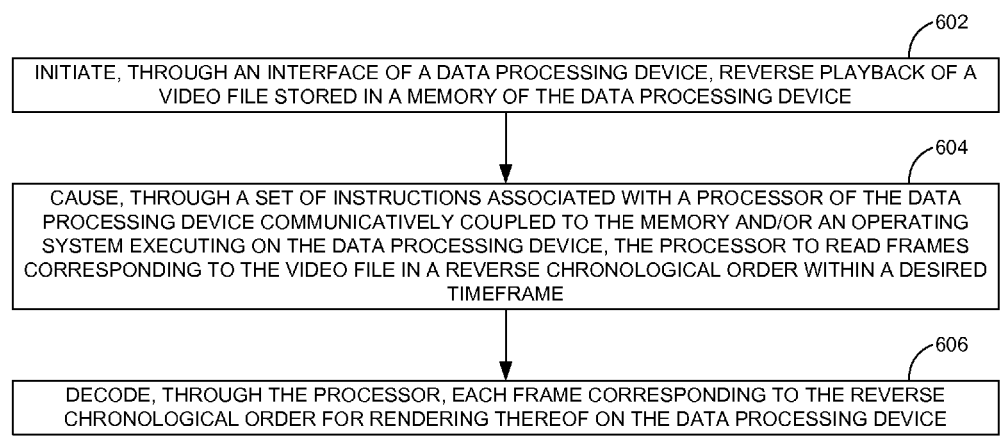
FIG. 6 is a process flow diagram detailing the operations involved in reverse video playback in the data processing device of FIG. 1, according to one or more embodiments.

FIG. 6 shows a process flow diagram detailing the operations involved in reverse video playback in data processing device 100, according to one or more embodiments. In one or more embodiments, operation 602 may involve initiating, through an interface (e.g., user interface 300 of multimedia application 122) of data processing device 100, reverse playback of a video file (e.g., video file 172) stored in memory 104 of data processing device 100. In one or more embodiments, operation 605 may involve causing, through a set of instructions associated with processor 102 of data processing device 100 and/or operating system 106 executing on data processing device 100, processor 102 to read frames corresponding to the video file in a reverse chronological order within a desired timeframe following the initiation of the reverse playback.

In one or more embodiments, operation 606 may then involve decoding, through processor 102, each frame corresponding to the reverse chronological order for rendering thereof on data processing device 100.

Applications of the reverse video playback discussed above may include but is not limited to conflict resolution in sports/events (e.g., tennis, athletics, shooting) through video evidence and video effects such as anti-gravity and zero-gravity.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry, firmware, software or any combination of hardware, firmware, and software (e.g., embodied in a non-transitory machine-readable medium). For example, the various electrical structure and methods may be embodied using transistors, logic gates, and electrical circuits (e.g., Application Specific Integrated Circuitry (ASIC) and/or Digital Signal Processor (DSP) circuitry).

In addition, it will be appreciated that the various operations, processes, and methods disclosed herein may be embodied in a non-transitory machine-readable medium and/or a machine accessible medium compatible with a data processing system (e.g., data processing device 100), and may be performed in any order (e.g., including using means for achieving the various operations).

Accordingly, the specification and drawings are to be regarded in an illustrative rather than a restrictive sense.

What is claimed is:

1. A method comprising:
   initiating, through an interface of a data processing device, reverse playback of a video file stored in a memory of the data processing device;
   causing, through at least one of a set of instructions associated with a processor of the data processing device communicatively coupled to the memory and an operating system executing on the data processing device, the processor to read frames corresponding to the video file in a reverse chronological order within a desired timeframe following the initiation of the reverse playback, wherein a timestamp is associated with each one of the frames;
   decoding, through the processor, each frame corresponding to the reverse chronological order for rendering thereof on the data processing device; and
   determining a frame rate for the rendering based to maintain a time interval between the timestamps associated with the decoded frames equal to the time interval between the timestamps associated with the frames during a forward playback of the video file.

2. The method of claim 1, wherein at least one of:
   the interface of the data processing device is at least one of: a physical button on the data processing device, a user interface of a multimedia application executing on the data processing device, a touchscreen option on the data processing device and an on-screen menu option on the data processing device,
   the set of instructions is part of a driver component, and
   the video file is in a Motion Joint Photographic Experts Group (MJPEG) format.

3. The method of claim 2, wherein the timeframe corresponds to a current position of a seek bar on the multimedia application executing on the data processing device and a desired position of the seek bar related to a temporal past with reference to the current position.

4. The method of claim 3, comprising synchronizing a reverse movement of the seek bar with the reverse video playback.

5. The method of claim 2, further comprising:
   implementing a multimedia framework on the data processing device;
   transmitting, through the multimedia application, an event related to the reverse playback to the multimedia framework; and
   executing the reverse playback through the multimedia framework, in conjunction with the processor.

6. The method of claim 1, comprising dispensing with decoding audio data related to the video file during the reverse playback.

7. The method of claim 1, wherein the initiating of the reverse playback of the video file is automatic following completion of play of the video file.

8. The method of claim 1, wherein the initiating of reverse playback of the video file is automatic following completion of play of the video file.

9. The method of claim 1, wherein the initiating of reverse playback of the video file is automatic following completion of play of the video file.

10. A non-transitory medium, readable through a data processing device and comprising instructions embodied therein that are executable through the data processing device, comprising:
    instructions to initiate, through an interface of the data processing device, reverse playback of a video file stored in a memory of the data processing device;
    instructions to cause, through at least one of a set of instructions associated with a processor of the data processing device communicatively coupled to the memory and an operating system executing on the data processing device, the processor to read frames corresponding to the video file in a reverse chronological order within a desired timeframe following the initiation of the reverse playback, wherein a timestamp is associated with each one of the frames;
    instructions to decode, through the processor, each frame corresponding to the reverse chronological order for rendering thereof on the data processing device; and
    instructions to determine a frame rate for the rendering based to maintain time interval between the timestamps associated with the decoded frames equal to the time interval between the timestamps associated with the frames during a forward playback of the video file.

11. The non-transitory medium of claim 10, comprising instructions compatible with at least one of:
    the interface of the data processing device being at least one of: a physical button on the data processing device, a user interface of a multimedia application executing on the data processing device, a touchscreen option on the data processing device and an on-screen menu option on the data processing device,
    the set of instructions being part of a driver component, and
    the video file being in an MJPEG format.

12. The non-transitory medium of claim 11, comprising instructions related to the timeframe corresponding to a current position of a seek bar on the multimedia application executing on the data processing device and a desired position of the seek bar related to a temporal past with reference to the current position.

13. The non-transitory medium of claim 12, comprising instructions to synchronize a reverse movement of the seek bar with the reverse video playback.

14. The non-transitory medium of claim 11, comprising instructions to:
    transmit, through the multimedia application, an event related to the reverse playback to a multimedia framework implemented in the data processing device; and
    execute the reverse playback through the multimedia framework, in conjunction with the processor.

15. The non-transitory medium of claim 10, comprising instructions to dispense with decoding audio data related to the video file during the reverse playback.

16. A data processing device comprising:
    a memory including a video file therein;
    a processor communicatively coupled to the memory;
    an interface to initiate reverse playback of the video file stored in the memory; and
    a driver component associated with the processor, at least one of the driver component and an operating system executing on the data processing device being configured to cause the processor to read frames corresponding to the video file in a reverse chronological order within a desired timeframe following the initiation of the reverse playback, wherein a timestamp is associated with each one of the frames and the processor further being configured to:
        execute instructions to decode each frame corresponding to the reverse chronological order for rendering thereof on the data processing device, and
        determine a frame rate for the rendering based to maintain a time interval between the timestamps associated with the decoded frames equal to the time interval between the timestamps associated with the frames during a forward playback of the video file.

17. The data processing device of claim 16, wherein at least one of:
    the interface of the data processing device is at least one of: a physical button on the data processing device, a user interface of a multimedia application executing on the data processing device, a touchscreen option on the data processing device and an on-screen menu option on the data processing device, and
    the video file is in an MJPEG format.

18. The data processing device of claim 17, wherein the timeframe corresponds to a current position of a seek bar on the multimedia application executing on the data processing device and a desired position of the seek bar related to a temporal past with reference to the current position.

19. The data processing device of claim 17, further comprising a multimedia framework implemented therein,
    wherein the multimedia application is configured to transmit an event related to the reverse playback to the multimedia framework, and
    wherein the multimedia framework is configured to execute the reverse playback in conjunction with the processor.

20. The data processing device of claim 16, wherein decoding audio data related to the video file during the reverse playback is dispensed with.

* * * * *